United States Patent [19]

Higby et al.

[11] Patent Number: 5,305,414
[45] Date of Patent: Apr. 19, 1994

[54] LOW LOSS GLASS AND OPTICAL FIBERS THEREFROM

[75] Inventors: Paige L. Higby, Burke; Ishwar D. Aggarwal, Fairfax Station, both of Va.; Edward J. Friebele, Cheverly, Md.

[73] Assignee: The United States of America as represented by the Secretary of the Navy, Washington, D.C.

[21] Appl. No.: 923,450

[22] Filed: Aug. 3, 1992

[51] Int. Cl.$^5$ ............................................. G02B 5/14
[52] U.S. Cl. ................................. 385/142; 385/141; 385/144; 501/42
[58] Field of Search ...................... 385/141, 142, 144; 501/41, 42

[56] References Cited

U.S. PATENT DOCUMENTS

| | | | |
|---|---|---|---|
| 4,194,807 | 3/1980 | Gliemeroth | 385/142 |
| 4,197,136 | 4/1980 | Jinoue et al. | 385/142 |
| 4,771,020 | 9/1988 | Omata et al. | 501/42 |
| 4,999,321 | 3/1991 | Kohli | 501/42 |
| 5,148,510 | 9/1992 | Borrelli et al. | 385/141 |

FOREIGN PATENT DOCUMENTS 0381620  5/1973  U.S.S.R. ................................ 385/42

OTHER PUBLICATIONS

Miller, "Properties and Structure of Alkali and Alkaline Earth Gallogermanate Glasses", 1991, pp. 4 & 110.

*Primary Examiner*—Rodney B. Bovernick
*Assistant Examiner*—Hemang Sanghavi
*Attorney, Agent, or Firm*—Thomas E. McDonnell; George A. Kap

[57] ABSTRACT

Optical fibers and glass composition comprising a mixture of barium oxide, gallium oxide, germanium oxide, and a modifying agent selected from lanthium oxide, indium oxide, and mixtures thereof; molar ratio of barium oxide to gallium oxide is from about 4:1 to about 1:1, preferably 2:1 to 1, and especially about 1:1; amount of germanium oxide is at least 40 mole percent, preferably 60 to 95 mole percent, and especially 65 to 90 mole percent; about 0.1 to about 5 mole percent, preferably 0.5 to 4, of gallium oxide is replaced with the modifying agent. The optical fibers made from the glass composition defined herein, with or without the modifying agent, have light transmission wavelength band of about 0.3 to 4 microns; lower optical loss than silica-based optical fibers, the minimum optical loss of the novel fibers having the potential of 0.05 dB/km at 2 microns.

15 Claims, No Drawings

LOW LOSS GLASS AND OPTICAL FIBERS THEREFROM

FIELD OF THE INVENTION

This invention relates to low-loss optical glass composition and optical fibers or waveguides made therefrom.

BACKGROUND OF INVENTION

The manufacture of optical waveguide fibers has long passed from an early, primarily experimental stage to a fully commercial stage in which a growing number of customer's transmission needs are being satisfied over short and long distances and at various wavelengths corresponding to visible as well as to invisible radiation. The manufacture of commercial fiber typically is based on silica glass technology and involves drawing from a massive body or preform having a cross-sectional refractive index profile as designed for effective guiding of one or several radiation modes.

With respect to most currently used optical fiber, optical waveguide structure can be described in terms of a higher-index core portion which is surrounded by a lower-index portion such as typically, a glass cladding. At the core-cladding interface there may be a relatively abrupt change in refractive index; alternatively, and especially in the case of fibers designed for the transmission of a plurality of modes, refractive index may decrease gradually towards a fiber surface. A refractive index difference between core and cladding typically results from the addition of one or several suitably chosen dopants or additives to otherwise essentially pure silica; e.g., the addition of boron or fluorine results in a lowered refractive index, and the addition of aluminum, germanium, phosphorus, or titanium produces an increased refractive index.

Considerable progress has been made in the development of methods for the manufacture of optical waveguide fiber preforms, and a number of such methods have been found capable of producing preforms from which low-loss fibers can be drawn. One such method is described in U.S. Pat. No. 4,217,027, issued Aug. 12, 1980 to J.B. MacChesney et al. Still, and such progress notwithstanding, development efforts continue towards further reducing optical loss, such reductions being in the interest of lengthening the distance over which signals can be transmitted without amplification or regeneration.

Optical fiber for long distance communications has reached a remarkable state of perfection. For instance, single mode fibers having loss of about 0.20 dB/km are routinely being produced. Nevertheless, there is still great interest in further reducing the signal loss, since even a reduction as small as 0.01 dB/km can translate into a significant increase in the permitted distance between repeaters. This in turn can translate into a significant difference in system cost, especially for transmission systems such as transoceanic fiber optic systems that by necessity have to employ highly complex and thus costly repeaters.

Optical fibers from a silica glass composition have become preeminent in the communication field because advantages such as cost and relative facile processing. However, optical fibers from a silica composition have certain shortcomings which impose limitations on the use thereof. For instance, silica-based optical fibers can transmit light over the limited range of about 0.2–2.0 (um) microns wavelength and have the lowest optical loss of about 0.2dB/km at 1.55 $\mu$m wavelength.

In her Ph.D thesis, Rutgers University, 1991, A.E. Miller discloses glass composition of germanium oxide, barium oxide, and gallium oxide.

SUMMARY OF THE INVENTION

An object of this invention is to provide germanate glasses for optical transmission application which have long IR cut-off wavelength relative to silicate glasses.

Another object of this invention is composition and optical fibers made therefrom which can transmit light over the range of about 0.3–4 $\mu$m wavelength.

Another object of this invention is glass composition and optical fibers made therefrom which have a minimum optical loss of about 0.05 dB/km.

Another object of this invention is glass composition consisting essentially of germanium oxide, barium oxide, gallium oxide, and a modifying agent selected from lanthanum oxide or indium oxide.

Another object of this invention is oxide glass composition which have a wider processing window than prior art glass compositions.

These and other objects of this invention can be accomplished by a glass composition which includes at least 65 mole percent germanium oxide, barium oxide, gallium oxide and a modifying agent selected from lanthanum oxide or indium oxide and optical fibers made therefrom.

DETAILED DESCRIPTION OF INVENTION

This invention pertains to a glass composition and to optical fibers made therefrom which optical fibers can transmit over a wider wavelength band than silica-based optical fibers and which optical fibers have a lower optical loss than silica-based fibers.

It should be understood that the present invention contemplates both single mode and multimode optical fibers or optical waveguides regardless of any specific description set out herein. Furthermore, the present invention also contemplates optical fibers having cores with either a constant or a gradient index of refraction.

Whereas the prior art silica-based optical fibers can transmit light over the range of about 0.2–2 $\mu$m, optical fibers made from the glass composition described herein can transmit light over the range of about 0.3–4 $\mu$m. Furthermore, whereas silica-based optical fibers have a minimum optical loss of about 0.2 dB/km at a light wavelength of 1.55 $\mu$m, the optical fibers of the invention herein made from the glass composition described herein have a potential minimum optical loss of about 0.05 dB/km at a light wavelength of 2 $\mu$m or a scattering loss of 0.02 dB/km at wavelength of 2 $\mu$m (microns or micrometers).

The optical loss, particularly of the core of the optical fibers described herein, is a combination of scattering loss and absorption loss. Scattering loss is inversely proportional to the glass wavelength to the power of four. This means that glass transmitting light of longer wavelength will have lower scattering loss. Absorption loss generally is a combination of losses due to impurities and intrinsic losses. The optical loss of the novel optical fibers described herein should be in the range of about 0.05 dB/km to about 0.1 dB/km. Generally speaking, lower scattering loss is associated with longer wavelength of the glass components which in turn is directly related to the IR edge.

Therefore, because heavier glass components are used, the optical loss of the optical fibers made from the glass composition disclosed herein is several times lower than the loss of the optical fibers made from pure silica or doped silica glass composition and transmission of light can be accomplished over a wider wavelength band.

The glass of this invention, which can transmit light over visible and infrared regions of the light spectra, is characterized by a composition which contains at least three components, preferably at least four components, although, it should be understood that the glass composition described and claimed herein can contain more components than specified herein. The glass composition described herein contains germanium oxide($GeO_2$), barium oxide(BaO), gallium oxide($Ga_2O_3$ or more correctly, gallium sesquioxide), and a modifying agent selected from lanthanum oxide($La_2O_3$) and indium oxide($In_2O_3$) although the optical fibers can also be made from glass compositions containing, as the main components, only germanium oxide, barium oxide, and gallium oxide, without the modifying agent. It should be understood that other components can be included in the glass composition disclosed herein as long as they do not change the character of the glass.

To avoid crystallization, the mole ratio of barium oxide to gallium oxide ($Ga_2O_3$) should be about 2:1 to 1:1, preferably 1.5:1 to 1:1, and amount of germanium oxide should be about 60 to 95 mole percent, preferably 65-90 mole percent, based on the amount of germanium oxide, barium oxide and gallium oxide in the glass composition. If the glass composition is melted with no intention of processing into fibers, the amount of germanium oxide in the glass composition can be as low as about 40 mole percent and the ratio of barium oxide to gallium oxide can be as high as about 4:1 and as low as about 1:1, on molar basis, in order to avoid crystallization in the glass, where crystallization is undesirable. About 0.1 to about 5 molar percent, preferably 0.5-4, of gallium oxide in the glass composition can be replaced with the modifying agent selected from lanthanum oxide and indium oxide. This means that if there is 15 mole percent of gallium oxide in a glass composition, up to about 5 mole percent of it can be replaced with a modifying agent, with mount of gallium oxide in the glass composition being 10 mole percent. Preferred modifying agent is lanthanum oxide.

Presence of the modifying agent in the glass composition described herein imparts another advantage thereto. The use of the modifying agent in the glass composition of this invention raises crystallization temperature but lowers the optical fiber drawing temperature of the glass composition. For instance, without any modifying agent, the draw temperature in one instance was 900° C. and crystallization temperature was about 850° C. In the same composition with 2 mole percent gallium oxide replaced by lanthanum oxide, i.e., the preferred modifying agent, draw temperature was 811° C. and the crystallization temperature was 903° C. With such draw and crystallization temperatures, the quick draw of the glass composition avoids crystallization therein if no modifying agent is used. Softening in the hot zone and subsequent solidification are too rapid for crystallization to take place.

Presence of the modifying agent reduces draw temperature and increases the crystallization temperature, as was already stated. However, what is pertinent herein is the degree to which the draw temperature is reduced and the crystallization temperature is increased. In the example given, with draw temperature at 811° C. and crystallization temperature at 903° C., there is no danger of crystallization taking place during the draw process.

The glass transition temperatures (Tg) of the glass compositions described herein are important because they affect the draw temperature. The lower the glass transition temperature of a glass composition, the lower will be its draw temperature. Glass transition temperatures of the glass composition described herein vary from about 600° C. to about 700° C. For instance, at the molar ratio of barium oxide to gallium oxide of 1, Tg of the glass composition containing 40 mole percent germanium oxide is slightly below 700° C. Also, at the molar ratio of barium oxide to gallium oxide of 1, the glass composition containing 65 mole percent germanium oxide has $T_g$ of about 667° C. The two glass compositions consisted only of barium oxide, gallium oxide, and germanium oxide. The draw temperatures of the glass compositions described herein are hundreds of degrees on Centigrade scale lower than the draw temperatures of the silica-based glass compositions.

As is known to persons skilled in this art, an optical waveguide includes a glass core and glass cladding enveloping the core. In an optical waveguide, a core is generally in the range of 5 to 150 microns in diameter whereas thickness of the cladding is generally in the range of 10-100 microns. Outside diameter of an optical fiber is in the range of about 100 to 200 microns. Index of refraction of the core and the cladding layer is adjusted so that the index of refraction of the core is higher than the index of refraction of the cladding. This relationship of the indices of the core and the cladding is necessary to maintain transmission of mode or modes of light within the core. A difference in the indices of at least about 0.005 can achieve this objective.

The glass composition disclosed herein, with or without the modifying agent, can be used to make the core and the cladding of the novel optical waveguides. In a preferred embodiment, both the core and the cladding of the novel optical waveguides are made from the glass composition disclosed herein, with or without the modifying agent. Index of refraction of the core and the cladding are coordinated with the core diameter in order to determine numerical aperture, i.e., a design parameter, in order to permit the desired mode or modes of light to be propagated through the core.

The numerical aperture of an optical waveguide is determined by taking the square root of the difference between square of index of refraction of the core and the square of index of refraction of the cladding. Value of the numerical aperture depends on the application of the optical waveguide. If the optical waveguide is to be single mode, the numerical aperture will be smaller than if the optical waveguide were to be multimode. A numerical aperture of 0.1 is considered to be small and the application of an optical waveguide with such a numerical aperture would be for transmission of a single mode. A numerical aperture of 0.5 is considered to be large, and an optical waveguide with such a numerical aperture would be used for multimode transmission.

The way the glasses are formed is by mixing high purity (99.999% plus) barium carbonate, gallium oxide and germanium oxide in suitable amount for 2 to 4 hours, melting the batch thoroughly, and quenching it into glass cullet. The cullet is then placed in a large platinum crucible, heated to a melting temperature and a vacuum applied at various intervals to assure that no dissolved gasses, including water vapor, remain in the melt.

Specific procedure for melting glass in a specific instance involved the initial determination of the desired composition, on mole percent basis. For the core, the composition was 15% barium oxide(BaO)-15% gallium oxide($Ga_2O_3$)-70% germanium oxide(GeO) and for the cladding the composition was, again on mole percent basis, 12.5% BaO-12.5% $Ga_2O_3$-75% $GeO_2$. For example, on weight basis, the core composition was 71 grams(g) barium carbonate, 68g gallium oxide, and 177g germanium oxide. The powder components of the glass composition were placed in a jar and dry-mixed for 2 hours. A rod-shaped platinum mold was preheated to 560° C. for at least 2 hours. The preheated mold was the apparatus into which the melted glass composition will be poured. The powder premix was removed from the mixer and charged into a platinum crucible. The crucible was placed into a furnace preheated to 1330° C. which had an inert gas purge. As the glass batch proceeded to melt, more powder glass batch was added to the crucible. All of the glass batch possible was fully charged into the crucible in 1 hour. After the glass was fully melted, it was quenched by placing the bottom of the crucible in water. At this point, glass cullet was removed from the crucible and placed in a storage container and additional glass batch powder was added to the crucible and melted at 1330° C., as previously described. When all of the glass batch powder had been melted once, the glass cullet from the storage container was remelted at 1330° C. for 1 hour under an inert gas purge. The temperature of the melt was then raised from 1330° C. to 1370° C. to make the melt more pourable and maintained at that temperature for ½ hour while purging the atmosphere with an inert gas. At this point, the mold was removed from the preheat furnace and the melt-containing crucible was removed from the melting furnace and poured into the mold. The glass rod was allowed to cool completely to room temperature in the mold. It was then removed from the mold and inspected with a polariscope or a microscope for bubbles and/or crystals. If no obvious defects were found, the glass rod was annealed as follows: temperature was increased to 640° C. at a rate of 10° C./min, held at that temperature for 3 hours, cooled to 550° C. at 2° C./min then to 300° C. at 5° C./min, and finally turned off furnace control and allowed the glass rod to cool to room temperature in the furnace.

A modified rod in tube procedure can also be used to make optical waveguides. The modified procedure involved the use of ultrasonic machining to drill a hole of about ⅛ inch in diameter into the rod of cladding material. The inside of the tube was polished. A core rod was prepared by stretching a poured core rod at high temperature to the desired diameter. The core rod and the clad tube were connected or merged into a preform by tacking them together in a flame or in a vacuum chuck. The preform was then placed in a draw furnace, drawn using standard techniques, and coated in-line with either a silicone or an acrylate coating.

In a specific embodiment of preparing the optical waveguide, the hot zone was about ½ inch wide, temperature in the hot zone was about 900° C., the draw rate was about 6 meters/min, and the tension was 24 grams. The cladding thickness in the drawn optical fiber was 70 microns and the core diameter was 30 microns. Its numerical aperture was 0.2. Index of refraction of the core was 1.697 and index of refraction of the cladding was 1.685, of the drawn optical fiber.

It should be noted that the optical waveguide prepared as described above is devoid of a modifying agent. Neither the core nor the cladding contained any modifying agent. Optical waveguides can be prepared from glass compositions which contain a modifying agent in which case, such waveguides will not only have a lower optical loss than comparable silica-based optical waveguides but they will also be able to transmit light over a wider wavelength. Such optical fibers will also have the advantage of having a lower draw temperature, when they are drawn.

As already noted, the invention herein generally relates to glass composition from which low-loss optical waveguides can be made. Low optical loss in a waveguide is important in that a signal can be transmitted in the fiber with little or negligible attenuation. Low loss is important in telecommunications because reduction or removal of signal amplifiers in a communication system results in increased reliability and lower cost. The longer unrepeatered systems are also critical to some military systems such as undersea communication systems and tethered missiles. An optical fiber of the oxide glass disclosed herein with an optical loss at least several times less than that of silica glass would be able to result in a repeaterless tether which is several times longer than the silica glass fiber tethered systems currently in use.

What is claimed is:

1. An optical fiber comprising a cladding layer formed from a glass and a core disposed within said cladding layer, said core being made of a glass having an index of refraction that is higher than the index of refraction of said cladding layer; said cladding glass having a composition comprising barium oxide, gallium oxide, and germanium oxide; said core glass having a composition comprising barium oxide, gallium oxide, and germanium oxide; said barium oxide and said gallium oxide in said core glass composition having a molar ratio in the range of about 2:1 to about 1:1 with respect to each other and the amount of germanium oxide is in the range of about 65 to 90 mole percent, based on the total amount of barium oxide, gallium oxide and germanium oxide in said glass composition; said core having an optical loss that is lower than that of optical loss of a silica-based core; and said core having light transmission band that is wider than that of silica-based optical fibers.

2. Optical fiber of claim 1 wherein optical loss of said core is in the range of about 0.05 dB/km to about 0.1 dB/km and said optical fiber can transmit light over the wavelength band of 0.3 to 4 microns.

3. Optical fiber of claim 1 wherein said core glass composition consists essentially of germanium oxide, barium oxide, gallium oxide and a modifying agent selected from the group consisting of lanthanum oxide, indium oxide, and mixtures thereof, with a molar ratio of barium oxide to gallium oxide of about 1:1.

4. Optical fiber of claim 2 having outside diameter in the range of about 100 to about 200 microns, based on outside diameter of said core and said cladding layer; said core having outside diameter in the range of about 5 to 150 microns; and thickness of said cladding layer is in the range of about 10 to about 100 microns.

5. Optical fiber of claim 4 wherein the molar ratio of barium oxide to gallium oxide is about 1:1.

6. An optical fiber comprising a cladding layer formed from a glass and a core disposed within said cladding layer made of a glass having an index of refraction that is higher than the index of refraction of said cladding layer; said core glass having composition comprising a mixture of barium oxide, gallium oxide, and germanium oxide; wherein about 0.1 to about 5 mole percent of gallium oxide is replaced with a modifying agent selected from lanthanum oxide, indium oxide, and mixtures thereof; said core having an optical loss that is lower than that of a silica-based core; and said core having light transmission band that is wider than that of silica-based optical fibers.

7. Optical fiber comprising a cladding layer and a core disposed within said cladding layer; index of refraction of said core is higher than index of refraction of said cladding layer; said cladding layer having a composition comprising barium oxide, gallium oxide, and germanium oxide; said core having optical loss that is at least several times lower than optical loss of a silica-based core; said core having light transmission wavelength band of about 0.3 to 4 microns; said core is composed of a glass composition comprising a mixture of barium oxide, gallium oxide, and germanium oxide; molar ratio of barium oxide to gallium oxide in said glass composition is about 1:1; and amount of germanium oxide in said glass composition is 65 to 90 mole percent, based on the amount of barium oxide, gallium oxide, and germanium oxide in said glass composition.

8. An optical fiber comprising a cladding layer and a core disposed within said cladding layer; the index of refraction of said core is higher than the index of refraction of said cladding layer; said core having an optical loss that is at least several times lower than that of a silica-based core; said core having light transmission wavelength band of about 0.3 to 4 microns; said core comprises a glass composition including a mixture of barium oxide, gallium oxide, and germanium oxide; the molar ratio of barium oxide to gallium oxide in said glass composition being about 1:1; the amount of germanium oxide in said glass composition being 65 to 90 mole percent, based on the total amount of barium oxide, gallium oxide, and germanium oxide in said glass composition; wherein about 0.1 to about 5 mole percent of gallium oxide in said composition is replaced with a modifying agent selected from lanthanum oxide, indium oxide, and mixtures thereof; said cladding having an outside diameter in the range of about 100 to about 200 microns; said core having an outside diameter in the range of about 5 to about 150 microns; and said cladding layer having thickness in the range of about 10 to 100 microns.

9. Optical fiber of claim 8 wherein said cladding layer is composed of a glass composition comprising a mixture of barium oxide, gallium oxide, and germanium oxide; wherein molar ratio of barium oxide to gallium oxide is in the range of about 2:1 to about 1:1; and wherein amount of germanium oxide in said glass composition is 65 to 90 mole percent, based on the amount of barium oxide, gallium oxide, and germanium oxide in said glass composition.

10. Glass composition of claim 8 wherein said modifying agent is lanthanum oxide.

11. Glass composition comprising barium oxide, gallium oxide, germanium oxide and a modifying agent selected from lanthanum oxide, indium oxide, and mixtures thereof; molar ration of barium oxide to gallium oxide is in the range of about 4:1 to about 1:1, for purpose of determining said molar ratio; amount of germanium oxide is at least about 40 mole percent; and a portion of gallium oxide is replaced with a modifying agent selected from lanthanum oxide, indium oxide and mixtures thereof, amount of said modifying agent is to be counted as gallium oxide.

12. Glass composition of claim 11 wherein said molar ratio of barium oxide to gallium oxide is in the range of about 2:1 to about 1:1; and amount of germanium oxide is 65 to 90 mole percent, based on the amount of barium oxide, gallium oxide, germanium oxide, and said modifying agent.

13. Glass composition of claim 12 wherein said molar ratio of barium oxide gallium oxide is about 1:1 and said modifying agent is lanthanum oxide.

14. Glass composition of claim 13 wherein component of said glass composition are of a plurality of 99.999% or better.

15. Glass composition of claim 14 wherein melting temperature of said glass composition is about 1350° C.

* * * * *